March 24, 1959  E. H. HAHN  2,878,900
SELF-ENERGIZING DISC BRAKE AND SELF-ADJUSTER MEANS THEREFOR
Filed July 9, 1956  3 Sheets-Sheet 2

INVENTOR
E. H. Hahn
BY Robert Cobb
ATTORNEYS

March 24, 1959 E. H. HAHN 2,878,900
SELF-ENERGIZING DISC BRAKE AND SELF-ADJUSTER MEANS THEREFOR
Filed July 9, 1956 3 Sheets-Sheet 3
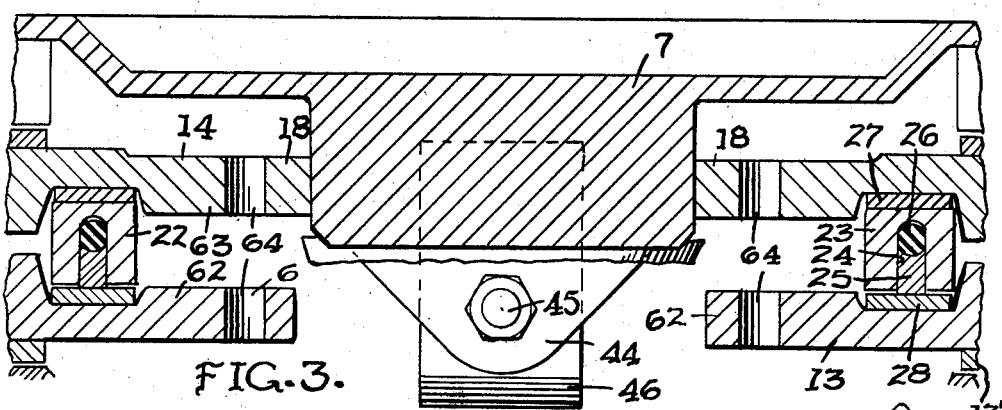
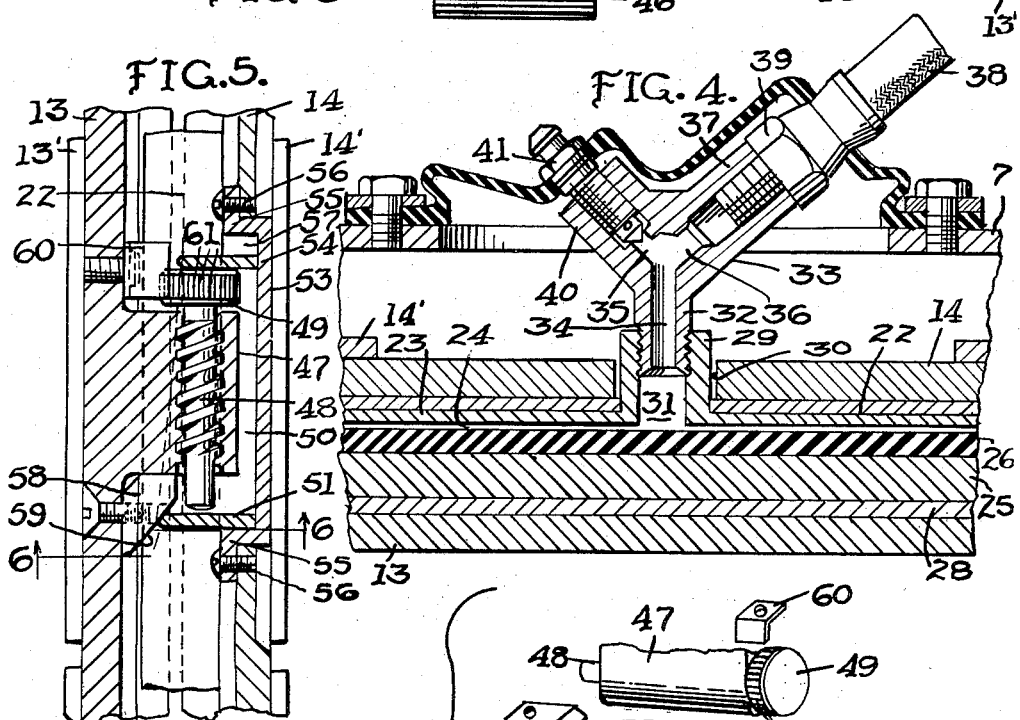
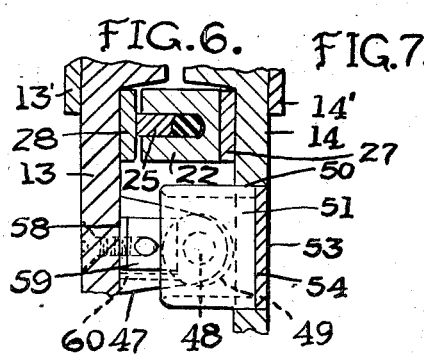
INVENTOR
E. H. Hahn
BY
Robb & Robb
ATTORNEYS

United States Patent Office 2,878,900
Patented Mar. 24, 1959

2,878,900

SELF-ENERGIZING DISC BRAKE AND SELF-ADJUSTER MEANS THEREFOR

Emil H. Hahn, St. Joseph, Mich., assignor, by mesne assignments, to Lambert Brake Corporation, St. Joseph, Mich., a corporation of Michigan Application July 9, 1956, Serial No. 596,495

9 Claims. (Cl. 188—72)

The present invention relates to disc brakes, and more particularly to disc brakes of the self-energizing type and to novel self-adjuster means for such brakes.

Numerous problems are encountered in the production of an ideal disc brake of the self-energizing type, including the problem of noises produced by such brakes upon initial brake application. Such noises are occasioned by the shifting of one of the discs into engagement with a fixed stop to anchor the disc against braking-torque-responsive rotation, while another disc remains free for slight rotative movement along with the member to be braked, so as to effect self-energizing of the brake through the action of camming means between the brake discs for shifting the discs axially apart into braking engagement with the rotary member to be braked.

Remedies for obviating such a noise problem have been developed, including a disc brake of the type having an inner disc assembly comprising a pair of discs in back-to-back relation, with camming balls between the discs for shifting the discs axially apart and into braking engagement with the opposed radially extended walls of a rotary brake housing, and wherein one of the discs is mounted for axial movements into and out of engagement with the housing, but is precluded from rotative movement, while the other disc is freely mounted, not only for axial movement, but also for slight braking-torque-responsive rotative movements in either direction, so as to produce self-energization of the brake as aforesaid.

A desirable feature in the production of disc brakes, as well as other brakes in general, is the inclusion of automatic or self-adjuster means for maintaining a constant release clearance between the discs and the housing throughout the life of the friction lining material with which the discs are usually provided.

An additional problem is encountered in the production of a disc brake of the aforementioned type having self-adjuster means as aforesaid, because of the desirability that the brake be capable of self-energization in either direction of the rotation of the housing, and because of the desirability, and in some cases virtual necessity due to space limitations, that the adjuster means be capable of being disposed between the discs so as to occupy a minimum of space. Up to the time of the present invention, such a construction has not been provided.

A primary objective of the invention, therefore, is to provide a disc brake of the type previously described having novel self-adjuster means which enable the brake to be self-energizing in either direction of rotation of the housing to be braked, while effecting automatic adjustment of the brake responsive to brake applications, thus to maintain a constant release clearance between the discs and the friction surfaces of the housing.

Another objective is to provide a disc brake of the type having an axially shiftable actuator disc which is fixed against rotative movement, a slightly rotatable and axially shiftable disc disposed adjacent to the first-mentioned disc, camming means between the discs for forcing the discs axially apart and into braking engagement with the brake housing upon slight rotation of the rotatable disc, and self-adjuster means cooperative with said discs to limit movement of said discs axially towards one another when the brake is released, so as to compensate for wear by maintaining a constant release clearance between the discs and the housing, while leaving the rotatable disc free for rotation in either direction. Such a brake, accordingly, will be self-energizing during both forward and reverse braking, and the self-adjuster means will be operative to effect adjustment of the brake during braking of either forward or reverse movements of a vehicle equipped with such brakes, to compensate for wear of the cooperative friction surfaces and to maintain at a minimum the necessary actuating movements of the discs irrespective of whether the vehicle is moving forwardly or rearwardly.

A further objective is to provide a novel automatic adjuster for brakes and the like, comprising a pair of spaced, opposed abutments on one brake member, a support on an adjacent brake member which is movable relative to the first-mentioned brake member, said support projecting into the space between said abutments, a slide also disposed in the space between said abutments and normally engaged at one end with one of said abutments, said slide being of a length less than the distance between said abutments, a one-way shiftable member carried by said support and extended longitudinally for engagement at its opposite ends with said slide, so that upon relative movement of said support between said abutments, the one-way shiftable member will be shifted axially with relation to the support, thus adjusting the relative positions of said slide and said support. In addition, the slide and the support or the member by which the support is carried are provided with cooperatively engaged surfaces, one of which is disposed at an angle to the direction of movement of the slide to adjust return movements of the slide responsive to shifting of the one-way shiftable member in its support, and to accordingly adjust the brake.

Other objectives and advantages of the invention will be hereinafter described or will become apparent to those skilled in the art, and the novel features thereof will be defined in the appended claims.

In the accompanying drawings:

Fig. 3 is an enlarged fragmentary view in section, as taken on the line 3—3 of Fig. 1;

Fig. 4 is an enlarged fragmentary view in section, as taken on the line 4—4 of Fig. 2;

Fig. 5 is an enlarged fragmentary view in section, as taken on the line 5—5 of Fig. 1 through one of the adjusters;

Fig. 6 is a fragmentary view in section, as taken on the line 6—6 of Fig. 5; and Fig. 7 is an exploded detail view showing the adjuster elements in perspective.

Figure 1:
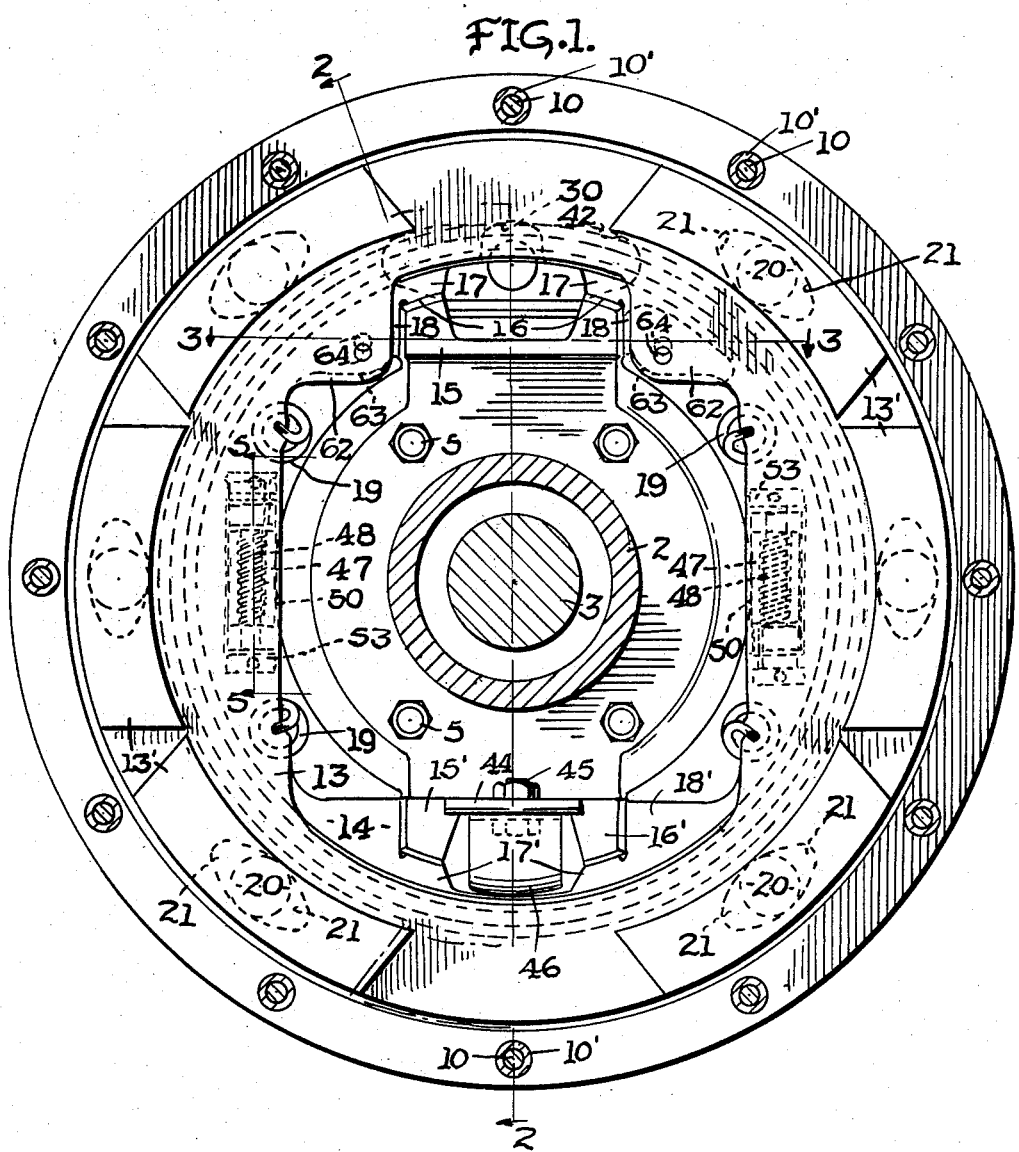
Fig. 1 is a view partly in side elevation and partly in section, as taken on the line 1—1 of Fig. 2, showing a brake made in accordance with the invention, with the outboard side of the housing and its support broken away to disclose the interior construction of the brake.
Figure 2:
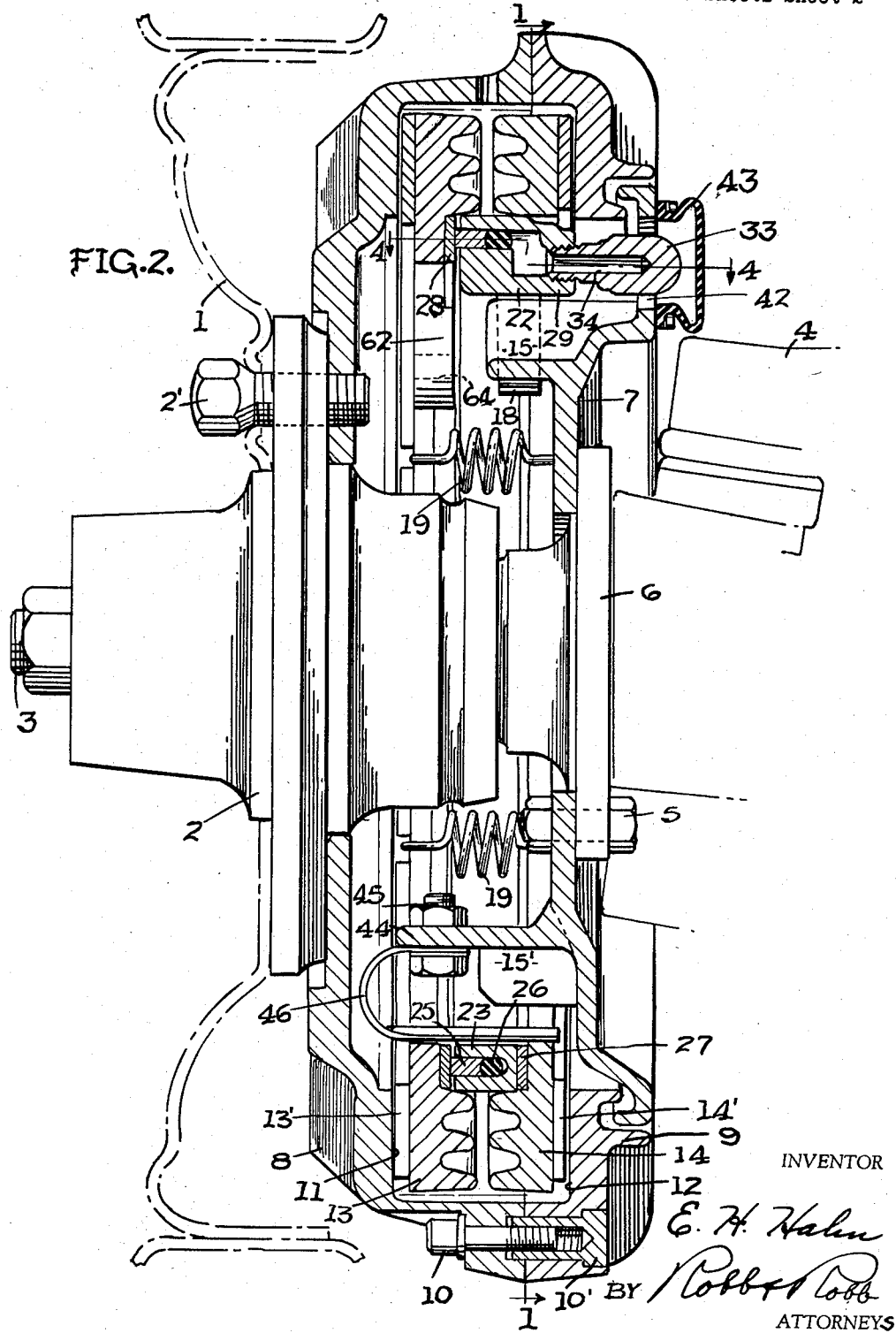
Fig. 2 is an enlarged view in section, as taken on the line 2—2 of Fig. 1.

Like reference characters in the several figures of the drawings and in the following description designate corresponding parts, wherein 1 generally denotes a vehicle wheel or other rotatable member which is suitably mounted upon a rotatable supporting member or wheel-supporting hub 2 as by means of a suitable number of screws 2'. The hub 2 is suitably journalled upon an axle 3, this axle or other support being constituted by a spindle which is carried by the front wheel supporting structure 4 of a motor vehicle.

Fixedly connected as by a suitable number of bolts 5 to a radially extended flange 6 on the spindle 3 is a backing or adapter plate 7. The backing plate 7 is disposed in an open side of a rotatable brake housing assembly comprising an outboard housing section 8 and in inboard housing section 9 which are suitably joined at their outer peripheries as by means of a plurality of screws 10 and recessed nuts 10′, with the outboard housing section 8 connected to the hub 2 in any suitable manner for rotation therewith. Interiorly of the housing, the housing sections 8 and 9 are constructed and arranged to provide a pair of opposed, axially spaced, radially extended friction surfaces 11 and 12 on the respective housing sections 8 and 9, between which is disposed a pair of discs 13 and 14. The discs 13 and 14 are respectively provided on their faces opposing the friction surfaces 11 and 12 with friction lining segments 13′ and 14′ which are preferably bonded to the discs 13 and 14.

The backing plate 7 is provided with a pair of diametrically spaced disc-supporting lugs 15 and 15′ having bearing projections 16, 16 and 16′, 16′ thereon for engagement with a corresponding number of radial projections 17, 17 and 17′, 17′ on the inner periphery of the inboard disc 14, the disc 14 also having anchor lugs 18, 18 and 18′, 18′ disposed for engagement with the projections 16 and 16′, so that the disc 14 is precluded from rotative movement, but is free for axial sliding movements upon the supporting lugs 15 and 15′.

A plurality of circumferentially spaced brake release springs 19 are interconnected with the discs 13 and 14 for pulling the discs axially towards one another, and a plurality of circumferentially spaced camming balls 20 are disposed in oppositely inclined ramped seats 21 in the opposing faces of the discs 13 and 14. Accordingly, the discs 13 and 14, with the balls 20 trapped in the seats 21 by the tension of the springs 19, constitute an inner disc assembly, one disc of which is supported upon the backing plate 7 for axial movements, and the other disc of which is supported upon the axially movable disc for compound axial and slight rotative movements. Upon engagement of the discs 13 and 14 with the friction surfaces 11 and 12 in the housing, the outboard disc 13 will tend to "clock" along with the housing in either direction of rotation, thus effecting a camming action of the balls 20 in the ramped seats 21 which will force the discs axially into engagement with the housing sections 8 and 9 with a powerful self-energization which is proportional to the load on the brake.

In order to effect initial engagement of the discs 13 and 14 with the housing, an annular hydraulic or other fluid-operated actuator device generally designated 22 is disposed between the discs, this actuator device 22 including an annular cylinder body 23 having an annular piston chamber 24 therein, and an annular piston 25 reciprocably mounted in the piston chamber with an annular seal 26 disposed behind the piston for sealing the actuator against leakage of fluid.

In order to prevent the transmission of heat from the discs 13 and 14 to the actuator device during brake operations, a pair of insulator rings 27 and 28 are preferably respectively disposed between the cylinder body 23 and the disc 14 and between the piston 25 and the disc 13.

For admitting fluid under pressure into the piston chamber 24 of the annular actuator device 22, the cylinder body 23 is provided with a laterally projecting neck 29 which extends through a marginal depression 30 in the inboard disc 14, this neck 29 having a passage 31 therein for admitting fluid into the piston chamber 24. Threadedly supported in the neck 29 is a stem 32 of a fitting 33, the stem 32 having a passage 34 therethrough leading into the passage 31 previously referred to. Communicating with the passage 34 are a pair of diverging passages 35 and 36, the passage 36 being disposed in an arm 37 of the fitting 33 which is adapted to receive fluid from a conduit 38 which is suitably connected to the fitting 33 as at 39. The fitting 33 also has an arm 40 in which is disposed a bleeder valve 41, through which air and fluid may be bled from the actuator device through the passage 35. The fitting 33 projects through an opening 42 in the backing plate 7, and the opening 42 is preferably sealed against the admission of water, dirt or other foreign matter into the brake housing, as by the provision of a rubber or other resilient boot 43 which is secured to the backing plate 7 in any suitable manner and which sealingly embraces the conduit 38 and the bleeder valve 41.

For the purpose of eliminating vibration of the inner disc assembly on the supporting lugs 15 and 15′, the supporting lug 15′ is preferably provided with an axially projecting extension 44 to which is suitably secured, as by means of a screw 45 or the like, a generally U-shaped leaf spring 46 which bears against the inner peripheries of the discs 13 and 14, thus biasing the disc assembly into snug engagement with the opposed supporting lug 15. This arrangement takes up any play between the discs and the supporting lugs therefor resulting from manufacturing tolerances.

In accordance with a primary objective of the invention, means are provided for automatically adjusting the release clearance of the brake responsive to brake operations, so that a substantially constant release clearance is maintained, while the outboard disc 13 remains free for slight rotative movements to effect self-energization of the brake, regardless of the direction of rotation of the housing.

In this connection, the outboard disc 13 is provided at diametrically opposite positions on its inboard face with a pair of axially projecting adjuster lugs 47, and a one-way shiftable member 48 is shiftably mounted in each of the adjuster lugs 47. The one-way shiftable members 48 are preferably each in the form of an adjuster screw which is threadedly mounted in one of the adjuster lugs 47, with the screws each having their lead end facing in the same direction circumferentially of the disc 13. The other end of the respective screws 48 is provided with an enlarged head 49. Shiftably engaged with the inboard disc 14 opposite each adjuster lug 47 is a slide 50, said slide 50 having opposed end walls 51 and 52 overlying the opposite ends of the respective screws 48. For the purpose of supporting the slides 50, the disc 14 is preferably provided with a slide-supporting cage 53 for each slide, each cage 53 including a base 54 disposed in a recess or opening in the disc 14 and having supporting ends 55, 55 adapted to be secured to the disc 14 as by screws 56, 56 or the like. It will be understood, of course, that if desired, the cage structure may be cast into the disc 14 during manufacture, and a separate cage such as that herein disclosed would not be necessary. In any event, however, each cage 53 is of a greater length than the respective slides 50, and the slides 50 are normally adapted to abut with the cages 53 at one end of the cages, thereby leaving a gap or space designated 57 between the opposite ends of the respective slides 50 and the cages 53. In opposed relation to the ends 51 of the slides 50, the disc 13 has secured thereto, or formed integrally therewith, an adjuster ramp 58 for each adjuster, said adjuster ramps each having a surface 59 disposed at an angle to the rotative plane of the disc 13 during brake applications. The end wall 51 of each adjuster slide 50 is disposed for engagement with the angularly disposed face 59 of the respective ramps 58 so that, depending upon the relative positions of the disc 13 and the slide 50, movement of the discs 13 and 14 axially towards one another will be limited by engagement of the end walls 51 of the slides 50 with the ramps 58. For a purpose which will hereinafter become apparent, the angle of the face 59 of the ramps 58 is directly proportional to the angle of the energizing ramps 21 in which the balls 20 are disposed, so that upon rotative movement of the disc 13 relative to the disc 14, the balls 20 will effect axial spreading of the discs at substantially the same rate that the slide end walls 51 climb the ramp surfaces 59, whereby the slide end walls 51 are maintained in engagement with the ramp surfaces 59 during rotative movement of the disc 13.

The proportional relationship of the adjuster ramps 58 and the self-energizing ball ramps 21 may be expressed mathematically by the formula:

$$\text{Tan } A = \frac{r}{R} \times \tan B$$

$A=$ the angle of the adjuster ramps;
$r=$ the radial distance of the energizing ramps from the central axis of the brake;
$R=$ the radial distance of the adjuster ramps from the central axis of the brake; and
$B=$ the angle of the energizing ramps.

Upon reference to Fig. 5, it will be observed that a slight gap or clearance exists between the lead end of the adjuster screw 48 and the end wall 51 of the slide 50, and said end wall 51 is in abutting engagement with the corresponding end of the cage 53. Therefore, until such time as the friction lining segments 13' and 14' have worn to such an extent that the disc 13 must move rotatively relative to the disc 14 for a distance greater than the space between the lead end of the adjuster screw 48 and the end wall 51 of the slide 50, no adjustment of the brake will be effected. However, as the friction lining material progressively wears, the respective adjuster screws 48 will abut with the end walls 51 of the slides 50, thereby exerting an axial force on the screws 48 and causing the screws to back out of the supporting lugs 47 for a distance dependent upon the amount of wear. As has been previously mentioned, each adjuster screw 48 constitutes a one-way shiftable member, and when the brake is released, the end wall 52 of the respective slides 50 will engage the heads 49 of the screws 48, and release movements of the disc 13 in a rotative direction will be limited by the slide 50 which is engaged with the cage 53 at its end wall 51. Accordingly, as the relative rotative movement of the discs is limited, the end walls 51 of the slides 50 will be precluded from riding back down the ramp surfaces 59, and the discs will be maintained in an adjusted axially spaced position by engagement of the slide end walls 51 with the ramps 58.

In order to prevent retrograde rotation of the screws 48, the disc 13 has secured thereto a pair of spring pawls or dogs 60 which are respectively disposed adjacent to the screw heads 49 for selective engagement in a plurality of circumferentially spaced peripheral serrations or teeth 61 on the screw heads 49. However, such prevention of retrograde rotation of the screws 48 will not prevent self-energization of the brake upon rotation of the disc 13 relative to the disc 14 in a direction opposite to the direction in which the adjusters are operative to effect adjustment of the brake, since the slide 50 is free to shift in the cage 53 of each adjuster by virtue of the provision of the space or gap 57, previously referred to. Therefore, while the adjusters are effective in adjusting the brake only during one direction of rotation of the housing, the adjustments produced by the adjusters are effective to correspondingly minimize actuating movements of the brake during braking of the housing when it is rotating in either direction. Moreover, by reversing end-for-end the direction in which the adjuster screws 48 extend, adjustment may be effected either during forward or during reverse braking of a vehicle having brakes embodying the adjusters thereof.

Generally summarizing the operation of the present self-energizing and self-adjusting brake as it would function when applied to the left front wheel of a motor vehicle when the vehicle is moving in a forward direction, admission of fluid under pressure into the annular actuator device 22 will cause axial spreading of the discs 13 and 14 into initial frictional engagement with the friction surfaces 11 and 12 in the housing. Upon such initial frictional engagement, the outboard disc 13 will rotate slightly in a counter-clockwise direction responsive to the drag torque of the rotating housing, thus effecting a powerful self-energization of the brake through the camming action of the balls 20 as they climb the opposed ramped seats 21. Self-adjustment of the brake will be accomplished as the result of the compound lateral and rotative relative movements of the discs 13 and 14 by the adjuster means responsive to shifting of the adjuster screws 48 in the screw supporting lugs 47, whereby the relative disposition of the end wall 51 of the respective adjuster slides 50 and the cooperative inclined or angularly disposed adjuster ramp surfaces 59 of the respective ramps 58 is adjusted.

On the other hand, when the vehicle is moving in a reverse direction, the outboard disc 13 is free to rotate along with the housing in a clockwise direction as the adjuster screw heads 49 cause the slides 50 to shift in the cages 53, thus enabling self-energization of the brake through the camming action of the balls 20 as previously described.

While the brake shown in the illustrative embodiment has been described as a brake for the left front wheel of a vehicle, it is equaly applicable, without changes, to the right front wheel of a vehicle. In addition, the discs 13 and 14 are respectively provided on their inner peripheries with a pair of circumferentially spaced ears 62, 62 and 63, 63 (see Fig. 1), these ears 62 and 63 being provided with openings 64, 64 therethrough for permitting the attachment of suitable mechanical operating means which will serve as auxiliary emergency operating means for the brake. Such a mechanical actuator is disclosed in a copending U.S. patent application, Serial No. 328,909, filed December 31, 1952, which forms no part of the present invention, but which is operative to effect relative rotation of the discs 13 and 14, whereby axial separation of said discs into engagement with the friction surfaces 11 and 12 will be produced by the balls 20. In addition, the provision of the openings 64 in the ears 63 on the outboard disc 13, as well as in the ears 63 on the inboard disc 14, enables the brake to be used as a rear wheel brake on either the right or the left side of a motor vehicle, with appropriate modification of the mounting therefor.

While the specific details of the invention have been herein shown and described, changes and alterations may be resorted to without departing from the spirit thereof as defined in the appended claims.

I claim:

1. A self-adjuster for friction devices having a pair of elements adapted for compound lateral and rotative actuating movements one relative to the other, comprising an adjuster ramp on one of said elements, an adjuster ramp-engaging member on the other of said elements, and one-way shiftable means for adjusting the relative positions of said adjuster ramp and said ramp-engaging member in response to said compound actuating movements of said elements to limit return movements of said elements.

2. Automatic adjuster means for brakes and the like, comprising a slide, means supporting said slide for movement in one direction while preventing movement of said slide exceeding a normal release clearance in the opposite direction, a ramp shiftably mounted with relation to said slide, said slide having a portion engaged with said ramp, and means for adjusting the relative positions of said ramp and said ramp-engaging slide portion upon relative movement of said ramp and said slide.

3. Automatic adjuster means as defined in claim 2, wherein the means for adjusting the relative positions of said ramp and said ramp-engaging slide portion includes a support fixedly disposed in relation to said ramp, and one-way shiftable means carried by said support and engaged with said slide, whereby relative shifting of said slide and support will shift said one-way shiftable member.

4. Automatic adjuster means as defined in claim 2, wherein the means for adjusting the relative positions of said ramp and said ramp-engaging slide portion includes a support fixedly disposed with relation to said ramp, said slide having opposed walls disposed at the respective opposite sides of said support, and one-way shiftable means carried by said support and projecting therefrom in opposite directions for engagement with said slide walls for shifting said one-way shiftable member and adjusting the relative positions of said support and said slide and consequently of said ramp and said ramp-engaging slide portion.

5. Automatic adjuster means as defined in claim 2, wherein the means for adjusting the relative positions of said ramp and said ramp-engaging slide portion includes a support fixedly disposed with relation to said ramp, said slide having opposed walls disposed at the respective opposite sides of said support, and one-way shiftable means carried by said support and projecting therefrom in opposite directions for engagement with said slide walls for shifting said one-way shiftable member and adjusting the relative positions of said support and said slide and consequently of said ramp and said ramp-engaging slide portion, said one-way shiftable member having the form of a screw, said support having a threaded opening in which said screw is threadedly mounted.

6. Automatic adjuster means as defined in claim 2, wherein the means for adjusting the relative positions of said ramp and said ramp-engaging slide portion includes a support fixedly disposed with relation to said ramp, said slide having opposed walls disposed at the respective opposite sides of said support, and one-way shiftable means carried by said support and projecting therefrom in opposite directions for engagement with said slide walls for shifting said one-way shiftable member and adjusting the relative positions of said support and said slide and consequently of said ramp and said ramp-engaging slide portion, said one-way shiftable member having the form of a screw, said support having a threaded opening in which said screw is threadedly mounted, said screw having a plurality of circumferentially spaced teeth at one end, and a pawl disposed adjacent to said one end of the screw and engageable with said teeth to prevent rotation of the screw in one direction.

7. An automatic adjuster of the class described for adjusting the relative return positions of a pair of elements which are relatively shiftable, comprising a support carried by one of said elements, a longitudinally extended one-way shiftable member, shiftably carried by said support, a pair of spaced abutments carried by the other of said elements, said one-way shiftable member projecting at its opposite ends from said support for engagement with said abutments and being shiftable relative to said support upon relative shifting of said elements, cooperative ramp and ramp-engaging means on the respective elements aforesaid, said ramp and ramp-engaging means being shiftable relative to one another upon relative movement of said elements in one direction, and said one-way shiftable member limiting relative return movement of said ramp and ramp-engaging means to adjust the return positions of said elements.

8. An automatic adjuster as defined in claim 7, wherein said pair of abutments is carried by a slide, said slide being shiftably mounted to allow relative movement of said elements in opposite directions, the element on which the slide is mounted having means engagable with said slide for limiting movement of said slide in one direction, and said ramp-engaging means also being carried by said slide.

9. An automatic adjuster as defined in claim 7, wherein said one-way shiftable member has the form of a screw, said screw being threadedly mounted in said support, and including means for preventing rotation of said screw in one direction.

References Cited in the file of this patent

UNITED STATES PATENTS

| | | |
|---|---|---|
| 2,132,576 | Nachtwey | Oct. 11, 1938 |
| 2,471,865 | Dieckmann | May 31, 1949 |
| 2,526,149 | Myers et al. | Oct. 17, 1950 |
| 2,563,759 | Tiscornia et al. | Aug. 7, 1951 |
| 2,595,860 | Lambert et al. | May 6, 1952 |
| 2,732,042 | Lucker | Jan. 24, 1956 |
| 2,736,396 | Rasmussen et al. | Feb. 28, 1956 |
| 2,774,445 | Pontius | Dec. 18, 1956 |
| 2,778,452 | Dosse | Jan. 22, 1957 |
| 2,778,453 | Hatfield | Jan. 22, 1957 |

FOREIGN PATENTS

| | | |
|---|---|---|
| 729,726 | Great Britain | May 11, 1955 |